(12) United States Patent
Tai et al.

(10) Patent No.: US 10,816,418 B2
(45) Date of Patent: Oct. 27, 2020

(54) THREE-LAYER SELF-HEALING FLEXIBLE STRAIN SENSOR AND PREPARATION METHOD THEREOF

(71) Applicant: University of Electronic Science and Technology of China, Chengdu, Sichuan (CN)

(72) Inventors: Huiling Tai, Sichuan (CN); Yujin Yao, Sichuan (CN); Dongsheng Wang, Sichuan (CN); Zhen Yuan, Sichuan (CN); Yadong Jiang, Sichuan (CN); Guangzhong Xie, Sichuan (CN); Xiaosong Du, Sichuan (CN)

(73) Assignee: University of Electronic Science and Technology of China, Chengdu, Sichuan (CN)

( * ) Notice: Subject to any disclaimer, the term of this patent is extended or adjusted under 35 U.S.C. 154(b) by 213 days.

(21) Appl. No.: 16/036,612

(22) Filed: Jul. 16, 2018

(65) Prior Publication Data
US 2018/0340848 A1 Nov. 29, 2018

(30) Foreign Application Priority Data
May 9, 2018 (CN) .......................... 2018 1 0440415

(51) Int. Cl.
*G01L 1/22* (2006.01)
*C09D 133/02* (2006.01)
*C08J 7/04* (2020.01)

(52) U.S. Cl.
CPC ............... *G01L 1/22* (2013.01); *C08J 7/0427* (2020.01); *C09D 133/02* (2013.01); *C08J 2333/02* (2013.01); *C08J 2433/02* (2013.01); *C08J 2479/02* (2013.01); *C08J 2483/04* (2013.01)

(58) Field of Classification Search
CPC ...... G01L 1/22; C09D 133/02; C08J 2333/02; C08J 2433/02; C08J 2479/02; C08J 2483/04; C08J 7/0427
See application file for complete search history.

(56) References Cited

FOREIGN PATENT DOCUMENTS

CN 206724883 * 5/2017

OTHER PUBLICATIONS

Machine translation of CN 206724883, retrieved Jul. 25, 2020.*

* cited by examiner

*Primary Examiner* — Michael B Nelson

(57) ABSTRACT

A three-layer self-healing flexible strain sensor includes: a self-healing sensitive layer, wherein a self-healing encapsulating layer is respectively placed on an upper surface and a lower surface of the self-healing sensitive layer. The self-healing sensitive layer comprises a doped carbon material or a conductive composite. The three self-healing layers of the self-healing strain sensor can quickly repair the internal and external damage caused by the layered structure in a short period of time after the external damage, and does not require external stimulation. The three-layer self-healing structure strain sensor is simple in preparation without using a repair agent, which can achieve rapid self-repair at the room temperature, and can be repeatedly repair. The three-layer self-healing structure increases the strength and modulus of the strain sensor as well as increases the ability of the strain sensor to resist external damage.

3 Claims, 2 Drawing Sheets

THREE-LAYER SELF-HEALING FLEXIBLE STRAIN SENSOR AND PREPARATION METHOD THEREOF

CROSS REFERENCE OF RELATED APPLICATION

The present invention claims priority under 35 U.S.C. 119(a-d) to CN 2018104404159, filed May 9, 2018.

BACKGROUND OF THE PRESENT INVENTION

Field of Invention

The present invention relates to a technical field of functional film, and more particularly to a three-layer self-healing flexible strain sensor and a preparation method thereof.

Description of Related Arts

In recent years, with the rapid development of materials science, flexible strain sensors not only overcome the rigidity and brittleness shortcomings of traditional strain sensors, but also greatly expand the application of strain sensors in the fields of biomedicine, electronic devices and wearable devices. In the course of use, due to external influences, inevitable defects or damages may be caused on the interior or surface of the material, which generally appear as cracks or micro cracks. These stratified cracks do not immediately lead to structural damage, but they are difficult to discover or detect. If the cracks cannot be repaired in time, they will cause the performance reduction of materials and devices, and even cause macroscopic fracture. Therefore, it is very necessary to effectively and timely repair cracks produced by stratified damage. The self-repairing function of each component layer of the strain sensor can effectively solve these problems.

Chinese patent CN206724883U discloses a self-healing flexible electronic strain sensor, which comprises two pieces of self-healing material plates arranged in parallel, and inner surfaces of the self-healing material plates are fixedly connected by coating a conductive layer of nanometer particles; the sensor has self-diagnosis and self-repairing features with light weight, good flexibility, and good toughness. However, such sensor can only ensure the good performance of the sensor when the self-healing layer encounters a relatively small damage with does not damage the conductive layer. When the sensor is subjected to complete fracture and failure, the performance of the sensor will be severely attenuated or even lost because the conductive layer of the nanometer particles has no self-healing feature, which is difficult to repair.

SUMMARY OF THE PRESENT INVENTION

An object of the present invention is to provide a three-layer self-healing flexible strain sensor and a preparation method thereof, wherein a technical problem that performance of conventional self-healing flexible strain sensors will be severely attenuated or even lost due to poor repair performance or incomplete repair after complete rupture.

Accordingly, in order to accomplish the above object, the present invention provides a three-layer self-healing flexible strain sensor, comprising: a self-healing sensitive layer, wherein a self-healing encapsulating layer is respectively placed on an upper surface and a lower surface of the self-healing sensitive layer.

Preferably, the self-healing encapsulating layer comprises: 0.2-0.33 parts by weight of hydroxyl-terminated polydimethylsiloxane (PDMS), 0.8-1 parts by weight of polyacrylic acid (PAA), 0.070-0.086 parts by weight of N,N'-dicyclohexylcarbodiimide (DCC) and 0.050-0.056 parts by weight of 4-(dimethyl)aminopyridine (DMAP).

Preferably, the self-healing sensitive layer comprises a doped carbon material or a conductive composite.

Preferably, the doped carbon material comprises 0.8-1 parts by weight of polyacrylic acid (PAA), 0.1-0.2 parts by weight of polydopamine (PDA), and 0.02-0.05 parts by weight of a carbon material; or 1 part by weight of polyacrylic acid (PAA), 0.2-0.33 parts by weight of hydroxyl-terminated polydimethylsiloxane (PDMS), 0.1-0.2 parts by weight of polydopamine (PDA), and 0.02-0.05 parts by weight of the carbon material.

Preferably, the carbon material is selected from a group consisting of graphene, reduced graphene oxide, graphene quantum dots, graphene nano-platelets, carbon nano-tubes, and carbon nano-fibers.

Preferably, the conductive composite comprises 0.8-1 parts by weight of polyacrylic acid (PAA), 0.1-0.2 parts by weight of polydopamine (PDA) and 0.05-0.1 parts by weight of ferric chloride ($FeCl_3$); or 1 part by weight of polyacrylic acid (PAA), 0.2-0.33 parts by weight of hydroxy-terminated polydimethylsiloxane, 0.1-0.2 parts by weight of polydopamine (PDA), and 0.05-0.1 parts by weight of ferric chloride ($FeCl_3$).

The present invention also provides a preparation method of a three-layer self-healing flexible strain sensor, comprising steps of:

S1: preparing a self-healing encapsulating layer composite, so as to obtain a concentrated solution;

S2: preparing a self-healing sensitive layer composite, so as to obtain a thick liquid;

S3: dropping the thick liquid on a glass substrate, and statically curing at a room temperature;

S4: dropping the concentrated solution on a cured film obtained in the S3, and statically curing at the room temperature;

S5: striping a cured filmed obtained in the S4 from the glass substrate, and drawing out two wires as electrodes; and S6: dropping the concentrated solution on the other surface of the cured film obtained in the S3 with a same amount of S4, and statically curing at the room temperature for obtaining the three-layer self-healing flexible strain sensor.

Preferably, the S1 specifically comprises steps of:

S101: adding 40-50 ml tetrahydrofuran into a reaction flask, then adding 0.8-1 g polyacrylic acid (PAA), 70-86 mg N,N'-dicyclohexylcarbodiimide (DCC) and 50-56 mg 4-(dimethyl)aminopyridine (DMAP) in sequence; putting a magnetic stir bar into the reaction flask and placing the reaction flask on a magnetic stirrer to stir with 400-500 r/min for 1-2 h;

S102: adding 0.2-0.33 g hydroxy-terminated polydimethylsiloxane (PDMS) into the reaction flask, sealing and magnetically stirring at the room temperature for 8-12 h; and S103: heating a solution obtained in the S102 to 60-90° C., then stirring for 20-30 min for evaporating a solvent till the solution is concentrated, so as to obtain the concentrated solution.

Preferably, the S2 specifically comprises steps of:

S201: preparing a conductive composite solution, which comprises steps of adding 40-50 ml tetrahydrofuran into a reaction flask, then adding 0.1-0.2 g polydopamine (PDA) and 0.05-0.1 g ferric chloride ($FeCl_3$); or 1 g polyacrylic acid (PAA), 0.2-0.33 g hydroxy-terminated polydimethylsiloxane, 0.1-0.2 g polydopamine (PDA) and 0.05-0.1 g ferric chloride ($FeCl_3$) in sequence; putting a magnetic stir bar into the reaction flask and placing the reaction flask on a magnetic stirrer to stir with 400-500 r/min for 8-12 h;

or preparing a doped carbon material solution, which comprises steps of adding 40-50 ml tetrahydrofuran into a reaction flask, then adding 0.8 g-1 g polyacrylic acid (PAA), 0.1-0.2 g polydopamine (PDA) and 0.02-0.05 g carbon material; or 1 g polyacrylic acid (PAA), 0.2-0.33 g hydroxy-terminated polydimethylsiloxane (PDMS), 0.1-0.2 g polydopamine (PDA) and 0.02-0.05 g the carbon material in sequence; and S202: heating a solution obtained in the S201 to 60-90° C., then stirring for 20-30 min for evaporating a solvent till the solution is thick, so as to obtain the thick liquid.

Therefore, with the foregoing technical schemes, beneficial effects of the present invention are:

1. In the present invention, the self-healing flexible strain sensor is divided into three layers, wherein the encapsulating layer and the sensitive layer respectively have a self-healing function.

2. In the present invention, the repair mechanism of the encapsulation layer of the self-healing flexible strain sensor is based on formation of hydrogen bonds between carboxyl groups on different polyacrylic acids, which can be repaired without external conditions at a room temperature.

3. In the present invention, the repair mechanism of the sensitive layer of the self-healing flexible strain sensor is based on one or two of a hydrogen bond and a metal coordination bond formed between carboxyl groups on different polyacrylic acids. Such dual-repair network ensures that repairs are easier and have a better repair effect.

4. In the present invention, the three self-healing layers of the self-healing strain sensor can quickly repair the internal and external damage caused by the layered structure in a short period of time after the external damage, and does not require external stimulation.

5. In the present invention, the three-layer self-healing structure strain sensor is simple in preparation without using a repair agent, which can achieve rapid self-repair at the room temperature, and can be repeatedly repair.

6. In the present invention, the three-layer self-healing structure increases the strength and modulus of the strain sensor as well as increases the ability of the strain sensor to resist external damage.

7. The present invention can be applied to a wearable device to monitor the human motion state; since the surface of the self-healing encapsulating layer material contains rich carboxyl groups, it has good self-adhesion and no irritation to the skin. On the one hand, there is no need to use extra tape to adhere the device to the skin, and on the other hand closely fitting the skin can increase the mechanical sensitivity of the flexible strain sensor.

These and other objectives, features, and advantages of the present invention will become apparent from the following detailed description, the accompanying drawings, and the appended claims.

Figure 1:
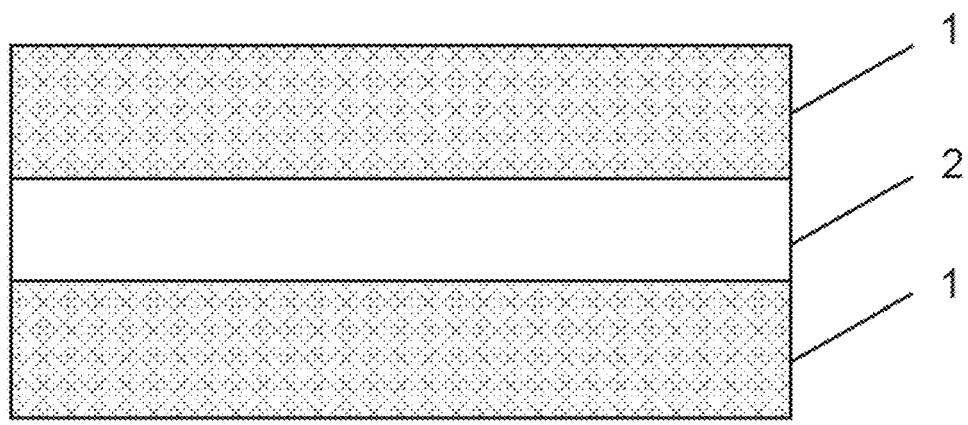
FIG. 1 is a sectional view of a three-layer self-healing flexible strain sensor of the present invention.

Element reference: 1-self-healing encapsulating layer, 2-self-healing sensitive layer.

DETAILED DESCRIPTION OF THE PREFERRED EMBODIMENT

Referring to FIGS. 1-4 of the drawings, the present invention will be further illustrated.

A three-layer self-healing flexible strain sensor is provided, comprising: a self-healing sensitive layer 2, wherein a self-healing encapsulating layer 1 is respectively placed on an upper surface and a lower surface of the self-healing sensitive layer 2. The self-healing encapsulating layer 1 comprises: 0.2-0.33 parts by weight of hydroxyl-terminated polydimethylsiloxane (PDMS), 0.8-1 parts by weight of polyacrylic acid (PAA), 0.070-0.086 parts by weight of N,N'-dicyclohexylcarbodiimide (DCC) and 0.050-0.056 parts by weight of 4-(dimethyl)aminopyridine (DMAP).

The self-healing sensitive layer comprises a doped carbon material or a conductive composite.

The doped carbon material comprises 0.8-1 parts by weight of polyacrylic acid (PAA), 0.1-0.2 parts by weight of polydopamine (PDA), and 0.02-0.05 parts by weight of a carbon material; or 1 part by weight of polyacrylic acid (PAA), 0.2-0.33 parts by weight of hydroxyl-terminated polydimethylsiloxane (PDMS), 0.1-0.2 parts by weight of polydopamine (PDA), and 0.02-0.05 parts by weight of the carbon material. The carbon material is selected from a group consisting of graphene, reduced graphene oxide, graphene quantum dots, graphene nano-platelets, carbon nano-tubes, and carbon nano-fibers.

The conductive composite comprises 0.8-1 parts by weight of polyacrylic acid (PAA), 0.1-0.2 parts by weight of polydopamine (PDA) and 0.05-0.1 parts by weight of ferric chloride ($FeCl_3$); or 1 part by weight of polyacrylic acid (PAA), 0.2-0.33 parts by weight of hydroxy-terminated polydimethylsiloxane, 0.1-0.2 parts by weight of polydopamine (PDA), and 0.05-0.1 parts by weight of ferric chloride ($FeCl_3$).

The present invention also provides a preparation method of a three-layer self-healing flexible strain sensor, comprising steps of:

S1: preparing a self-healing encapsulating layer composite, so as to obtain a concentrated solution;

wherein the S1 specifically comprises steps of:

S101: adding 40-50 ml tetrahydrofuran into a reaction flask, then adding 0.8-1 g polyacrylic acid (PAA), 70-86 mg N,N'-dicyclohexylcarbodiimide (DCC) and 50-56 mg 4-(dimethyl)aminopyridine (DMAP) in sequence; putting a magnetic stir bar into the reaction flask and placing the reaction flask on a magnetic stirrer to stir with 400-500 r/min for 1-2 h;

S102: adding 0.2-0.33 g hydroxy-terminated polydimethylsiloxane (PDMS) into the reaction flask, sealing and magnetically stirring at the room temperature for 8-12 h; and S103: heating a solution obtained in the S102 to 60-90° C., then stirring for 20-30 min for evaporating a solvent till the solution is concentrated, so as to obtain the concentrated solution;

S2: preparing a self-healing sensitive layer composite, so as to obtain a thick liquid;

wherein the S2 specifically comprises steps of:

S201: preparing a conductive composite solution, which comprises steps of adding 40-50 ml tetrahydrofuran into a reaction flask, then adding 0.1-0.2 g polydopamine (PDA) and 0.05-0.1 g ferric chloride (FeCl$_3$); or 1 g polyacrylic acid (PAA), 0.2-0.33 g hydroxy-terminated polydimethylsiloxane, 0.1-0.2 g polydopamine (PDA) and 0.05-0.1 g ferric chloride (FeCl$_3$) in sequence; putting a magnetic stir bar into the reaction flask and placing the reaction flask on a magnetic stirrer to stir with 400-500 r/min for 8-12 h;

or preparing a doped carbon material solution, which comprises steps of adding 40-50 ml tetrahydrofuran into a reaction flask, then adding 0.8 g-1 g polyacrylic acid (PAA), 0.1-0.2 g polydopamine (PDA) and 0.02-0.05 g carbon material; or 1 g polyacrylic acid (PAA), 0.2-0.33 g hydroxy-terminated polydimethylsiloxane (PDMS), 0.1-0.2 g polydopamine (PDA) and 0.02-0.05 g the carbon material in sequence; and S202: heating a solution obtained in the S201 to 60-90° C., then stirring for 20-30 min for evaporating a solvent till the solution is thick, so as to obtain the thick liquid;

S3: dropping the thick liquid on a glass substrate, and statically curing at a room temperature;

S4: dropping the concentrated solution on a cured film obtained in the S3, and statically curing at the room temperature;

S5: striping a cured filmed obtained in the S4 from the glass substrate, and drawing out two wires as electrodes; and S6: dropping the concentrated solution on the other surface of the cured film obtained in the S3 with a same amount of S4, and statically curing at the room temperature for obtaining the three-layer self-healing flexible strain sensor.

Embodiment 1

The present invention uses the doped carbon material to form the self-healing sensitive layer, and a preparation method of the three-layer self-healing flexible strain sensor comprises specific steps of:

S1: adding 40 ml tetrahydrofuran into a first reaction flask, then adding 0.8 g polyacrylic acid (PAA), 70 mg N,N'-dicyclohexylcarbodiimide (DCC) and 55 mg 4-(dimethyl)aminopyridine (DMAP) in sequence; putting a magnetic stir bar into the first reaction flask and placing the first reaction flask on a magnetic stirrer to stir with 400-500 r/min for 2 h; adding 0.2 g hydroxy-terminated polydimethylsiloxane (PDMS) into the first reaction flask, sealing and magnetically stirring at the room temperature for 12 h; and heating the solution to 90° C., then stirring for 20 min for evaporating a solvent till the solution is concentrated, so as to obtain the concentrated solution;

S2: adding 40 ml tetrahydrofuran into a second reaction flask, then adding 0.8 g polyacrylic acid (PAA), 0.25 g polydopamine (PDA) and 0.1 g carbon nano-tubes (CNTs); putting a magnetic stir bar into the second reaction flask and placing the second reaction flask on a magnetic stirrer to stir with 400-500 r/min for 12 h; heating a solution obtained to 90° C., then stirring for 20 min for evaporating a solvent till the solution is thick, so as to obtain the thick liquid;

S3: dropping the thick liquid on a clean glass substrate, and statically curing at a room temperature for 1 h;

S4: dropping the concentrated solution on a cured film obtained in the S3, and statically curing at the room temperature for 1 h;

S5: striping a cured filmed obtained in the S4 from the glass substrate, and drawing out two wires as electrodes; and S6: dropping the concentrated solution on the other surface of the cured film obtained in the S3 with a same amount of S4, and statically curing at the room temperature for obtaining the three-layer self-healing flexible strain sensor.

The three-layer self-healing flexible strain sensor prepared in the embodiment 1 has good tensile properties and conductive properties, which can be quickly repaired after being destroyed under room temperature conditions, and maintain good performance of the original sensor.

Embodiment 2

The present invention uses the conductive composite to form the self-healing sensitive layer, and a preparation method of the three-layer self-healing flexible strain sensor comprises specific steps of:

S1: adding 40 ml tetrahydrofuran into a first reaction flask, then adding 1 g polyacrylic acid (PAA), 86 mg N,N'-dicyclohexylcarbodiimide (DCC) and 60 mg 4-(dimethyl)aminopyridine (DMAP) in sequence; putting a magnetic stir bar into the first reaction flask and placing the first reaction flask on a magnetic stirrer to stir with 400-500 r/min for 2 h; adding 0.2 g hydroxy-terminated polydimethylsiloxane (PDMS) into the first reaction flask, sealing and magnetically stirring at the room temperature for 12 h; and heating the solution to 90° C., then stirring for 20 min for evaporating a solvent till the solution is concentrated, so as to obtain the concentrated solution;

S2: adding 40 ml tetrahydrofuran into a second reaction flask, then adding 0.8 g polyacrylic acid (PAA), 0.2 g polydopamine (PDA) and 0.1 g ferric chloride (FeCl$_3$); putting a magnetic stir bar into the second reaction flask and placing the second reaction flask on a magnetic stirrer to stir with 400-500 r/min for 12 h; heating a solution obtained to 90° C., then stirring for 20 min for evaporating a solvent till the solution is thick, so as to obtain the thick liquid;

S3: dropping the thick liquid on a clean glass substrate, and statically curing at a room temperature for 1 h;

S4: dropping the concentrated solution on a cured film obtained in the S3, and statically curing at the room temperature for 1 h;

S5: striping a cured filmed obtained in the S4 from the glass substrate, and drawing out two wires as electrodes; and S6: dropping the concentrated solution on the other surface of the cured film obtained in the S3 with a same amount of S4, and statically curing at the room temperature for obtaining the three-layer self-healing flexible strain sensor.

The three-layer self-healing flexible strain sensor prepared in the embodiment 2 has good tensile properties and conductive properties, which can be quickly repaired after being destroyed under room temperature conditions, and maintain good performance of the original sensor.

Embodiment 3

The present invention uses the conductive composite to form the self-healing sensitive layer, and a preparation method of the three-layer self-healing flexible strain sensor comprises specific steps of:

S1: adding 40 ml tetrahydrofuran into a first reaction flask, then adding 1 g polyacrylic acid (PAA), 86 mg N,N'-dicyclohexylcarbodiimide (DCC) and 50 mg 4-(dimethyl)aminopyridine (DMAP) in sequence; putting a magnetic stir bar into the first reaction flask and placing the first reaction flask on a magnetic stirrer to stir with 400-500 r/min for 2 h; adding 0.25 g hydroxy-terminated polydimethylsiloxane (PDMS) into the first reaction flask, sealing and magnetically stirring at the room temperature for 12 h; and heating the solution to 90° C., then stirring for 20 min for evaporating a solvent till the solution is concentrated, so as to obtain the concentrated solution;

S2: adding 40 ml tetrahydrofuran into a second reaction flask, then adding 1 g polyacrylic acid (PAA), 0.1 g polydopamine (PDA) and 0.04 g ferric chloride ($FeCl_3$); putting a magnetic stir bar into the second reaction flask and placing the second reaction flask on a magnetic stirrer to stir with 400-500 r/min for 12 h; heating a solution obtained to 90° C., then stirring for 20 min for evaporating a solvent till the solution is thick, so as to obtain the thick liquid;

S3: dropping the thick liquid on a clean glass substrate, and statically curing at a room temperature for 1 h;

S4: dropping the concentrated solution on a cured film obtained in the S3, and statically curing at the room temperature for 1 h;

S5: striping a cured filmed obtained in the S4 from the glass substrate, and drawing out two wires as electrodes; and S6: dropping the concentrated solution on the other surface of the cured film obtained in the S3 with a same amount of S4, and statically curing at the room temperature for obtaining the three-layer self-healing flexible strain sensor.

The three-layer self-healing flexible strain sensor prepared in the embodiment 3 has good tensile properties and conductive properties, which can be quickly repaired after being destroyed under room temperature conditions, and maintain good performance of the original sensor.

The strain sensor in embodiments 1-3 were cut into two sections with a blade after being tested and cut with a blade, wherein the two sections were placed in a fitted state, and the repair effect was observed and recorded (as in the following table).

|  | conductivity | stretchability | repairability |
| --- | --- | --- | --- |
| embodiment 1 | 2.1 M$\Omega$ | ~140% sufficient | within 30 s at room temperature |
| embodiment 2 | 320 K$\Omega$ | ~150% sufficient | within 30 s at room temperature |
| embodiment 3 | 530 K$\Omega$ | ~180% sufficient | within 30 s at room temperature |

Figure 2:
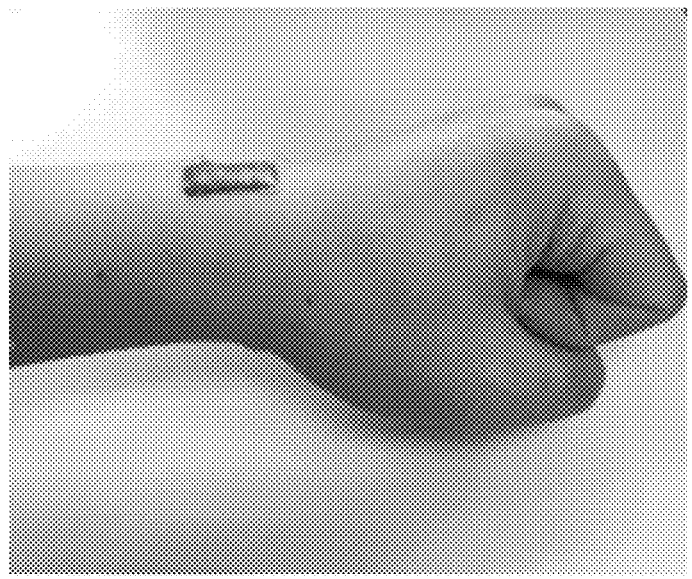
FIG. 2 is a sketch view of a self-healing flexible strain sensor according to an embodiment 3 of the present invention applying to a wrist in a relax state.
Figure 3:
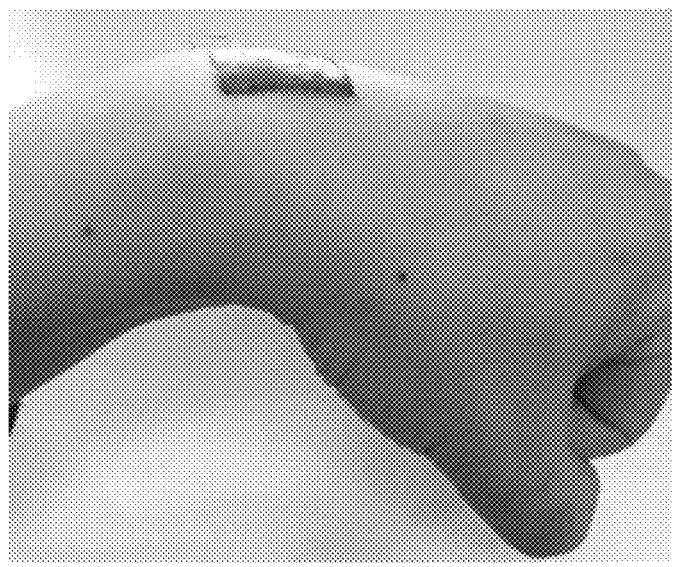
FIG. 3 is a sketch view of the self-healing flexible strain sensor according to the embodiment 3 of the present invention applying to the wrist in a bending state.
Figure 4:
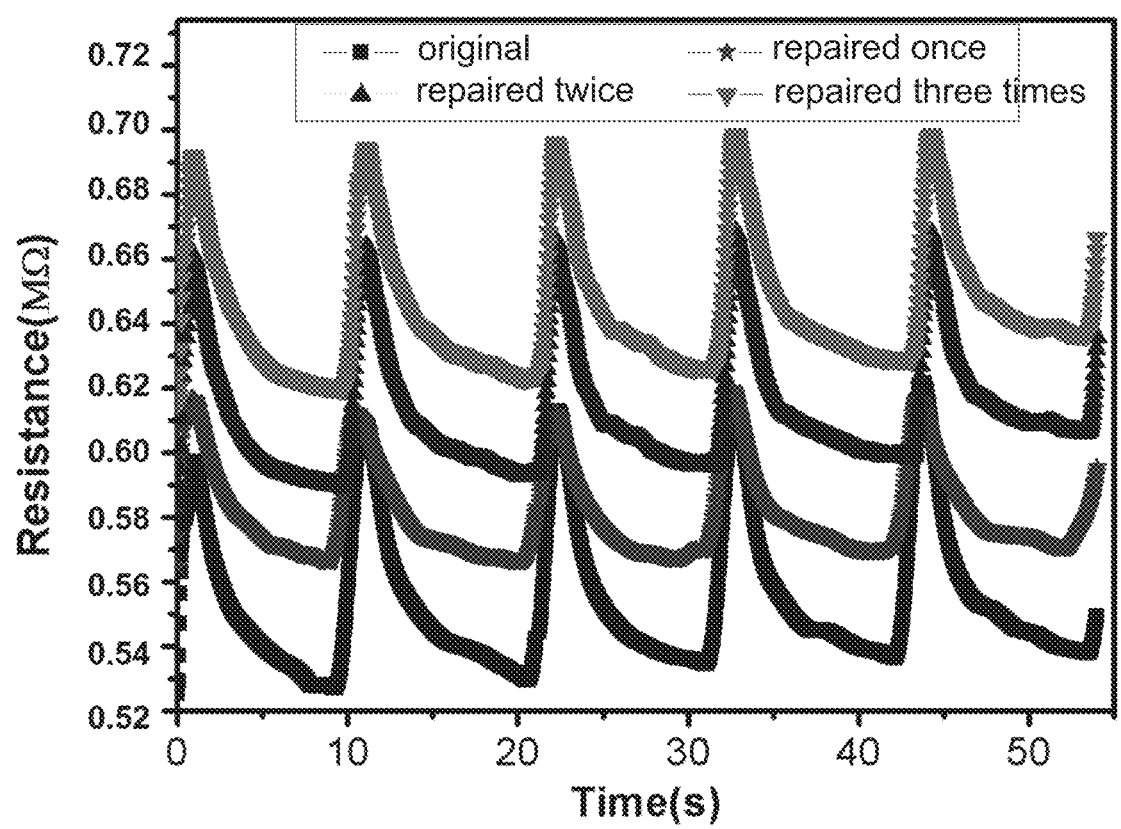
FIG. 4 illustrates a three-time repair test of the self-healing flexible strain sensor according to the embodiment 3 of the present invention.

The embodiment 3 was applied to the real-time monitoring of the human body movement state before and after the repair (as shown in FIG. 2-3). According to experimental results, the Keithley 4200-SCS signal collector was used to collect the resistance data, so as to monitor resistance change response diagram of wrist bending after different repair times. Referring to test curves of three different repair times in FIG. 4, the repaired three-layer self-healing flexible strain sensor still maintains good performance such as stability, response, and reproducibility. In addition, the three-layer self-healing flexible strain sensor can be used for real-time monitoring of the human body's small deformation physical activity (i.e. breathing or pulse) and movement state (i.e. joint bending).

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A three-layer self-healing flexible strain sensor, comprising: a strain sensitive layer (2), wherein a encapsulating layers (1) are respectively placed on an upper surface and a lower surface of the strain sensitive layer (2), wherein the strain sensitive layer (2) and the encapsulating layers (1) each have self-healing function, and wherein the strain sensitive layer (2) consists of 0.8-1 parts by weight of poly acrylic acid (PAA), 0.1-0.2 parts by weight of polydopamine (PDA), and 0.02-0.05 parts by weight of a carbon material.

2. The three-layer self-healing flexible strain sensor, as recited in claim 1, wherein the encapsulating layers (1) each comprise: 0.2-0.33 parts by weight of hydroxyl-terminated polydimethylsiloxane (PDMS), 0.8-1 parts by weight of polyacrylic acid (PAA), 0.070-0.086 parts by weight of N,N'-dicyclohexylcarbodiimide (DCC) and 0.050-0.056 parts by weight of 4-(dimethyl)aminopyridine (DMAP).

3. The three-layer self-healing flexible strain sensor, as recited in claim 1, wherein the carbon material is selected from a group consisting of graphene, reduced graphene oxide, graphene quantum dots, graphene nano-platelets, carbon nano-tubes, and carbon nano-fibers.

* * * * *